May 28, 1963

T. E. LINDERME 3,091,102

UNIVERSAL JOINT

Filed March 24, 1961

*INVENTOR.*
THEODORE E. LINDERME
BY
WILSON, SETTLE & CRAIG
ATTORNEYS

United States Patent Office 3,091,102
Patented May 28, 1963

3,091,102
UNIVERSAL JOINT
Theodore E. Linderme, Detroit, Mich.; Dorothy E. Linderme, executrix of said Theodore E. Linderme, deceased
Filed Mar. 24, 1961, Ser. No. 98,253
2 Claims. (Cl. 64—8)

This invention relates to a universal joint comprising a drive member and a driven member arranged so that the two members may take differing and varying angular relationships to one another while providing an operating drive therebetween.

Among the more important objects of the invention is to provide a universal joint wherein the two members may be disposed at relatively large angles to one another, as for example thirty degrees.

Another object of the invention is to provide a universal joint wherein the driving and driven members may have their angular relation instantly changed or varied at different values during operation of the joint, the arrangement being characterized by an absence of noise, chatter, or wear during the joint operation.

A further object of the invention is to provide a sturdy, low cost universal joint having a wide range of utility.

A still further object of the invention is to provide a universal joint wherein the joint components can be easily assembled together and retained in place against accidental displacement during periods of shipment, storage and installation.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
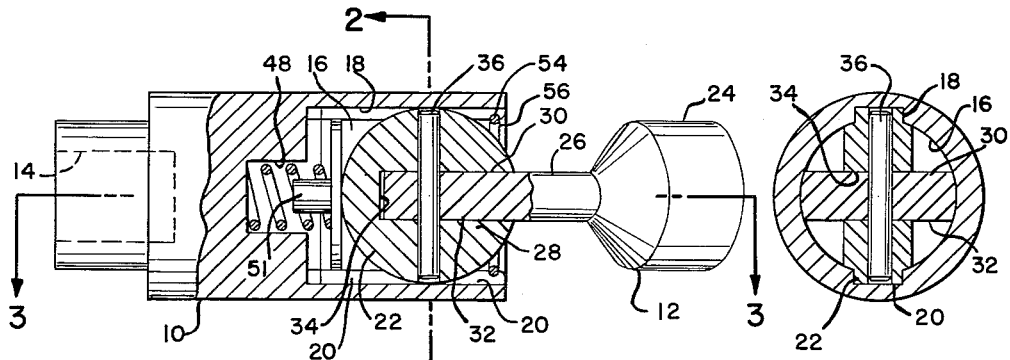
FIG. 1 is a longitudinal sectional view through one embodiment of the invention, taken on line 1—1 in FIG. 3.

Referring to FIG. 1 of the drawings, there is shown a universal joint comprising a female member 10 and a male member 12, each of said members having a bore 14 therein for attachment of the respective member to a shaft (not shown). Insofar as the present invention is concerned, either of members 10 or 12 can be secured to the driving shaft so that either member can be considered as a drive member for the joint. However, for purposes of better explaining the invention, in the following description member 10 will be considered as the driving member.

Figure 2:
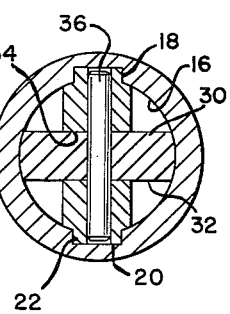
FIG. 2 is a sectional view taken on line 2—2 in FIG. 1.

By reference to FIGS. 1 and 2 it will be seen that member 10 is of generally hollow construction and is provided with a cylindrical bore or chamber 16. The cylindrical surface defined by chamber 16 is longitudinally grooved, as at 18 and 20 to provide a slide-way for receiving the edge portions of a roller 22. It will thus be seen that the roller is enabled to turn about its axis and to additionally slide longitudinally within member 10. Both of these rotating and sliding, rolling movements may be utilized during operation of the joint.

Connected with roller 22 is the aforementioned member 12, said member having a cylindrical end portion 24, a relatively small diameter cylindrical neck portion 26, and an enlarged end or head portion 28. As will be seen from FIG. 1, head portion 28 is provided with two flat oppositely facing side surfaces 30 and 32, and roller 22 is provided with a flat-surfaced notch 34 for receiving the head portion 28. The overlapped portions of roller 22 and head 28 are provided with aligned bores to receive the pivot pin 36, the arrangement being such as to permit member 12 to pivot on roller 22 about the axis of pin 36.

Figure 3:
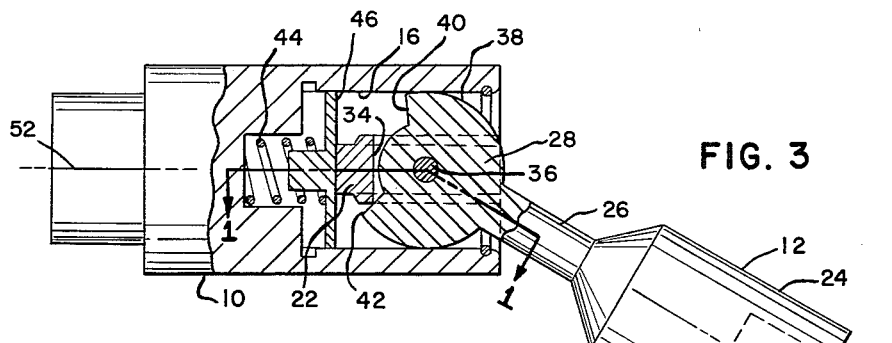
FIG. 3 is a sectional view taken on line 3—3 in FIG. 1.

Referring to FIG. 3 of the drawings, head 28 is provided with a generally cylindrical edge surface 38 which preferably engages the cylindrical surface 16 formed by bore 16 in member 10. This arrangement has some advantageous effect on the operation of the universal joint as regards precluding wear or failure of the parts, since it will be seen that engagement of surfaces 38 and 16 tends to prevent excessive radial load on the pin 36. However, in many cases the load on pin 36 will be relatively light, and in these cases head 28 can be of reduced dimension, i.e. surface 38 need not engage surface 16.

As shown in FIG. 3, head 28 is cut away to provide spaced shoulders 40 and 42. These shoulders are spaced a sufficient circumferential distance from one another to permit the members 10 and 12 to extend at relatively large angles to one another. As shown in FIG. 3 the axis 50 of member 12 extends at about thirty degrees to the axis 52 of member 10. It will be understood that the shoulders 40 and 42 have no particular purpose in limiting the angular displacement of members 10 and 12, the only purpose in these shoulders being that they enable the head 28 to be formed with a relatively large mass of material which enables the head to continually engage the surface of bore 16 and thereby be stabilized against inadvertent play or failure due to overload.

In certain installations it is necessary that the angle of the drive and driven members change or fluctuate during operation of the joint, and in order to accommodate the fluctuating movement there is provided in the illustrated embodiment a compression spring 44 and force transmitting disc 46. As shown in the drawings spring 44 is disposed within a small recess or pocket 48 in member 10, and disc 46 is provided with a pin-like projection 51 for preventing any cocking of the spring or possible binding of the disc. It will be understood that disc 46 is freely disposed within the cylindrical chamber 16 so as to be capable of back and forth movement therein as dictated by longitudinal displacement of roller 22.

Figure 4:
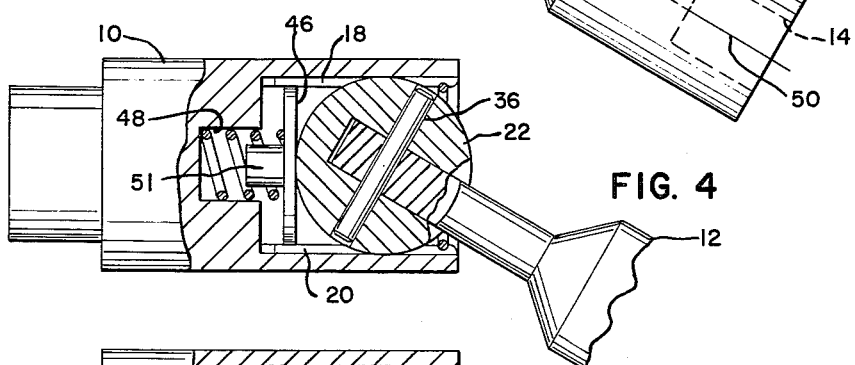
FIG. 4 is a view taken in the direction of FIG. 3, but showing the joint after a rotational movement of 90°.

FIGS. 3 and 4 illustrate the general mode of operation of the joint and the actions which take place during service. FIG. 4 is taken after the joint has rotated 90° from its FIG. 3 position. Thus, assuming member 10 to be the drive member, in the FIG. 3 position head 28 is disposed in the plane of the paper and roller 22 is disposed at right angles to the plane of the paper. Rotation of member 10 causes the surfaces of slots 18 and 20 to act as thrust surfaces for rotating the roller 22 from its FIG. 3 position to its FIG. 4 position in the plane of the paper. The rotation of roller 22 causes the slot surface at 34 to act as a thrust surface for imparting a rotary movement to member 12. Pin 36 also acts as a thrust member to transmit part of the thrust to member 12, although the primary function of pin 36 is to prevent longitudinal play such as would cause binding between members 12 and 22.

If we assume that member 12 is to maintain its axis 50 in a predetermined angular relation to the axis 52 of member 10, then it is necessary that pin 36 change its angle relative to the axis 52, since pin 36 necessarily extends at right angles to the axis 50. The necessary change in angle of member 36 is attained by a rolling action of roller 22 in the grooves 18 and 20. During this movement the geometric center of roller 22 does not move, either to the left or to the right, and insofar as the particular installation under discussion is concerned disc 46 could conceivably be rigid with member 10. In any event it will be seen that rotation of members 10 and 12 is accompanied by a rocking or rolling movement of roller 22 in grooves 18 and 20. The entire operation is characterized by lack of noise, wear or other malfunctioning.

In some cases the axis 50 of the member 12 is required to change its angle relative to axis 52 during the operation of the universal joint. Thus, if we assume that the shaft to which member 12 is secured has its remote end movable relative to the center point of roller 22 then member 12 must shift inwardly and outwardly within bore 16 during such movement. For accommodating this shifting movement the disc 46 is constructed as a floating, spring-urged member as shown in the drawings.

In service the driving and driven members of the universal joint are secured to input and output shafts so that the members need not be retained against separation. However, during storage, shipment, and installation the members should be retained against accidental separation from one another. Accordingly, in the FIG. 1 embodiment the cylindrical chamber 16 is provided with a circumferential groove 54 for receiving the stiff arcuate wire retainer 56. The retainer is of conventional construction and is of C-shaped configuration. It will be understood that the retainer may be omitted if desired and that other types of retainer structures such as caps or the like could be provided to retain roller 22 within chamber 16. The retainer has no function during service of the universal joint.

Figure 5:
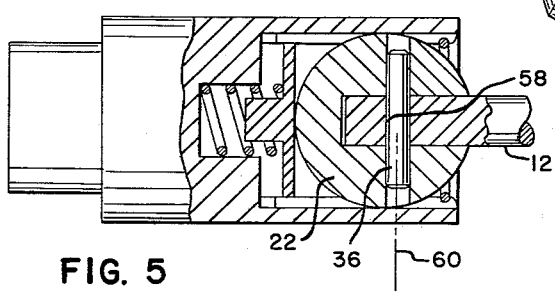
FIG. 5 is a view in the direction of FIG. 1, but of a second embodiment of the invention.

Referring to FIG. 5 of the drawings, there is shown a second embodiment of the invention which is generally similar to the FIG. 1 embodiment, the only essential difference being that pin 36 is offset to the right of the axis of the roller 22. Thus, the roller rotates about axis 58 while the pin 36 is mounted in member 12 to form a rotational axis 60. The operation of the FIG. 5 universal joint is essentially the same as the operation of the FIG. 1 joint.

The invention has been described with reference to two practical and operating embodiments thereof, but it will be appreciated that variations and modifications thereof may be resorted to without departing from the spirit of the invention as set forth in the accompanying claims.

I claim:
1. A universal joint comprising a drive member; a driven member; one of said members having a cylindrical chamber therein; longitudinal diametrically spaced grooves formed in the cylindrical surface of the chamber; a roller having its peripheral edge received in said grooves so that the roller can rotate about its axis and enjoy longitudinal movement within the chamber; a pocket extending from said chamber axially inwardly within said one member; a disc floatably positioned within the chamber between the pocket and roller; a compression spring disposed within pocket and engaged with the disc to urge same against an edge portion of the roller; a slot formed in the roller; the other end member having an end portion contoured to define two oppositely facing flat surfaces abutting against the surfaces formed by the slot; and a pivot pin extending through the roller and aforementioned end portion.

2. A universal joint comprising a drive member, a driven member, one of said members being of hollow construction and having two opposed grooves therein, a roller disposed within the interior of said one member, said roller having one arcuate edge portion disposed in one groove and another arcuate edge portion disposed in the other groove so that the roller is enabled to slide along the grooves and pivot about an axis normal to the imaginary plane of the grooves, said roller having a slot therein extending normal to the imaginary plane of the grooves, and said other member having an end portion received in said slot, a pivot pin extending through said roller and end portion of the other member to form a pivotal connection, said end portion of the other member having an arcuate peripheral edge portion in sliding contact with diametrically opposing portions of the interior surfaces of said one member.

References Cited in the file of this patent

UNITED STATES PATENTS

| | | |
|---|---|---|
| 706,403 | Follett | Aug. 5, 1902 |
| 1,128,432 | Fetzer | Feb. 16, 1915 |
| 1,512,840 | Flick | Oct. 21, 1924 |
| 2,381,102 | Boyd | Aug. 7, 1945 |
| 2,559,108 | Boge et al. | July 3, 1951 |
| 2,733,665 | Klopp | Feb. 7, 1956 |

FOREIGN PATENTS

| | | |
|---|---|---|
| 26,781 | Great Britain | of 1902 |